(12) United States Patent
Lahogue et al.

(10) Patent No.: US 10,363,697 B2
(45) Date of Patent: Jul. 30, 2019

(54) METHOD FOR CONTROLLING A CONVEYOR FOR HOLLOW BODIES THROUGH A HEATING STATION AND ASSOCIATED CONVEYOR

(71) Applicant: SIDEL PARTICIPATIONS, Octeville-sur-mer (FR)

(72) Inventors: Yoann Lahogue, Octeville-sur-mer (FR); Frederic Lecomte, Octeville-sur-mer (FR); Sebastien Fevre, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/569,297

(22) PCT Filed: Apr. 21, 2016

(86) PCT No.: PCT/FR2016/050934
§ 371 (c)(1),
(2) Date: Oct. 25, 2017

(87) PCT Pub. No.: WO2017/013317
PCT Pub. Date: Jan. 26, 2017

(65) Prior Publication Data
US 2018/0117825 A1 May 3, 2018

(30) Foreign Application Priority Data
Apr. 29, 2015 (FR) ...................................... 15 53860

(51) Int. Cl.
*B29C 49/42* (2006.01)
*B29C 49/68* (2006.01)
(Continued)

(52) U.S. Cl.
CPC ...... *B29C 49/4215* (2013.01); *B29C 49/4205* (2013.01); *B29C 49/68* (2013.01);
(Continued)

(58) Field of Classification Search
CPC .................................................. B29C 49/4215
See application file for complete search history.

(56) References Cited

U.S. PATENT DOCUMENTS 3,995,990 A 12/1976 Dwyer
4,793,960 A * 12/1988 Schad ..................... B29C 49/28
264/294
(Continued)

FOREIGN PATENT DOCUMENTS

DE 2510591 A1 9/1975
DE 19906366 A1 * 8/2000 ......... B29C 49/4205
(Continued)

OTHER PUBLICATIONS

DE19906366A1—machine translation (Year: 2000).*
International Search Report, dated Sep. 22, 2016, from corresponding PCT application No. PCT/FR2016/050934.

*Primary Examiner* — Nathaniel Herzfeld
(74) *Attorney, Agent, or Firm* — Young & Thompson

(57) ABSTRACT

Disclosed is a method for controlling a conveyor for conveying hollow bodies through a hollow-body heating station including: —a heating tunnel defining a heating path, —a conveyor including at least one travel track and shuttles capable of moving along the track while picking up at least one hollow body, the movement of each shuttle being controlled individually, —a travel-track loading portion on which two consecutive shuttles move at a first predetermined input separation, and a travel-track unloading portion. Two consecutive shuttles moving on this unloading portion
(Continued)

are spaced apart by a predetermined output separation that is different from the first input separation.

13 Claims, 2 Drawing Sheets

(51) Int. Cl.
    *F27B 9/24*     (2006.01)
    *B29K 67/00*     (2006.01)
    *B29L 31/00*     (2006.01)

(52) U.S. Cl.
    CPC .......... *F27B 9/24* (2013.01); *B29K 2067/003* (2013.01); *B29L 2031/7158* (2013.01)

(56) References Cited

U.S. PATENT DOCUMENTS

| | | | | |
|---|---|---|---|---|
| 5,066,222 A | * | 11/1991 | Roos | B29C 49/4205 425/526 |
| 5,308,233 A | | 5/1994 | Denis et al. | |
| 5,607,706 A | * | 3/1997 | Ingram | B29C 49/4205 264/535 |
| 5,863,571 A | * | 1/1999 | Santais | B29C 49/421 264/538 |
| 5,876,768 A | * | 3/1999 | Collombin | B29C 49/4205 264/454 |
| 5,980,229 A | * | 11/1999 | Collombin | B29C 49/68 264/454 |
| 6,241,939 B1 | * | 6/2001 | Takada | B29C 49/28 264/535 |
| 8,678,172 B2 | * | 3/2014 | Voth | B29C 49/4215 198/459.2 |
| 8,871,135 B2 | * | 10/2014 | Hausladen | B29C 49/02 264/509 |
| 9,039,405 B2 | * | 5/2015 | Zacche | B29C 49/4205 425/526 |
| 9,283,709 B2 | | 3/2016 | Lindner et al. | |
| 2008/0310941 A1 | * | 12/2008 | Freire-Diaz | B29C 49/4215 414/225.01 |
| 2012/0099846 A1 | * | 4/2012 | Schoenberger | B29B 13/024 392/422 |
| 2013/0035784 A1 | | 2/2013 | Wernersbach et al. | |
| 2013/0119897 A1 | | 5/2013 | Wernersbach et al. | |
| 2013/0241118 A1 | * | 9/2013 | Sato | B29C 49/4215 264/535 |
| 2015/0008768 A1 | | 1/2015 | Achterberg et al. | |
| 2015/0048693 A1 | | 2/2015 | Prussmeier | |

FOREIGN PATENT DOCUMENTS

| | | |
|---|---|---|
| DE | 102008042543 A1 | 4/2010 |
| EP | 0 571 262 A1 | 11/1993 |
| EP | 1 070 579 A1 | 1/2001 |
| EP | 2 848 382 A1 | 3/2015 |
| WO | 2013/143783 A1 | 10/2013 |
| WO | 2013/143950 A2 | 10/2013 |

* cited by examiner

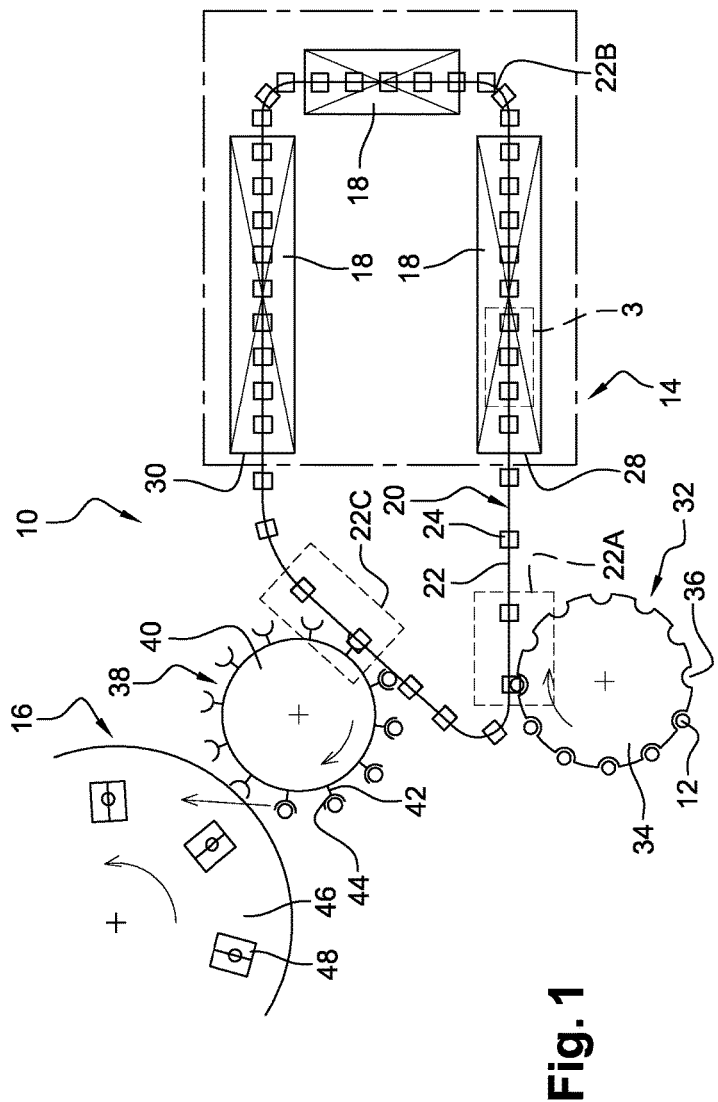

METHOD FOR CONTROLLING A CONVEYOR FOR HOLLOW BODIES THROUGH A HEATING STATION AND ASSOCIATED CONVEYOR

TECHNICAL FIELD OF THE INVENTION

The invention relates to a method for controlling a conveyor of hollow bodies through a heating station for an installation for producing containers of thermoplastic material, comprising:
- a heating tunnel defining a heating path;
- a conveyor comprising at least one moving track forming a circuit, and shuttles that can travel along the track carrying at least one hollow body, each shuttle being controlled individually in movement, the track having a heating section for the conveying of the hollow bodies along the heating path;
- an input device for the hollow bodies to be heated that brings the hollow bodies to a loading section of the moving track for their loading on the shuttles, two successive shuttles traveling with a first determined separation for input on this loading section;
- a device for output of the hot hollow bodies that recovers the hollow bodies carried on the shuttles that travel on an off-loading section of the moving track.

TECHNICAL BACKGROUND OF THE INVENTION

The production of containers of thermoplastic material, such as bottles, jars, etc., is generally carried out from preforms, sometimes called blanks, which are introduced into a molding device with which forming means are associated, for example blow-molding or stretch-blow-molding means.

In the following description and in the claims, the preforms and the finished containers will be designated under the generic term "hollow bodies." Traditionally, in this technical field, the preform and the finished container have an identical neck or throat. Consequently, the same element for support of a preform by its neck is also suited to support a finished container.

The installation for producing containers is supplied with preforms that are not in a state to be directly formed because of their insufficient temperature. Prior to their molding by blow molding or stretch blow molding, the preforms are therefore heated in a heating station so as to impart to them a sufficiently malleable structure for the blow-molding operation.

Such mass-production installations for containers are equipped with a heating station comprising a heating tunnel equipped with means for heating the preforms. This heating tunnel determines a heating path along which the preforms are generally transported by a conveyor at a stabilized speed without stopping. The tunnel has sufficient length to make possible the heating of the preforms during their transit.

The conveyor comprises individual support elements for the preforms that move along a closed circuit, a portion of which transports the preforms along the heating path that passes through the heating tunnel. The support elements are generally formed by mandrels that are able to drive the transported preforms in rotation around their axis to guarantee a homogeneous heating of the preforms.

Furthermore, the preforms are brought one after the other by an input device to an input zone in the heating station. The input device is generally formed by a rotating wheel equipped on its periphery with support elements for the preforms, such as notches or clips. The preforms are thus loaded on the conveyor in the area of the input zone, in which the path of the support elements of the conveyor is tangential to the path of the support elements of preforms of the input device.

To make possible a transfer of the preforms from the input device to the conveyor, the support elements of the conveyor must travel in a coordinated way, both in position and in speed, with the support elements of the input device in the input zone. On the input wheel, the preforms are spaced by a spacing that is determined according to their direction of movement. Consequently, it is absolutely essential that the individual support elements of the conveyor be spaced with a separation that is equal to the input spacing of the preforms during their passage in the input zone.

The same problem is encountered for the transfer of the hot preforms, at the output of the heating path, to an output device that is similar to the input device.

Furthermore, the heating station comprises a particularly long and cumbersome heating tunnel. It would therefore be advantageous to be able to make a shorter, and therefore more compact, heating tunnel without thereby degrading the quality of heating of the preforms.

In addition, in the heating stations that are known from the state of the art, the preforms moving in the heating tunnel are separated from one another by a relatively large spacing. Consequently, a large portion of the heating radiation emitted by the heating means is produced to no purpose, because it goes through the spaces left between two successive preforms without heating the latter. Thus, a large amount of energy is squandered.

According to another problem, the hot preforms are intended to supply at least one subsequent treatment station, in particular the forming station. It frequently happens that the spacing between two successive preforms in the subsequent treatment station is different from the spacing between two successive preforms transported by the input device. Consequently, a transfer device that is able to change the spacing between two preforms is generally inserted in the flow of the preforms downstream from the furnace and upstream from said subsequent treatment station.

Such a transfer device with change of spacing is not only expensive, but it also has the drawback of increasing the dimensions of the forming installation.

BRIEF SUMMARY OF THE INVENTION

The invention relates to a method for controlling a conveyor of the type previously described, characterized in that two successive shuttles traveling on the off-loading section are spaced with a determined output separation that is different from the first input separation.

According to other characteristics of the method:
- at least from their entry on the heating section, the shuttles are controlled so that the separation between two successive shuttles is reduced relative to said first input separation;
- the separation between two shuttles remains reduced relative to said first input separation as long as they travel on the heating section;
- the separation between two successive shuttles remains equal to a second constant separation as long as they travel on the heating section;
- the third output separation is different from the first input separation;

the output separation is greater than the second separation for heating.

The invention also relates to a conveyor for using the method according to the invention, characterized in that each shuttle comprises a first support element for a first hollow body and a second support element for a second hollow body, the shuttle thus being able to carry simultaneously two hollow bodies, the support elements being mounted to move on the shuttle between an extended position, in which the support elements are separated by said first input separation in the direction of movement of the shuttle, and a close position, in which the support elements are brought close to one another in the direction of movement of the shuttle.

According to other characteristics of the conveyor:
the shuttle comprises an arm that defines an axis of orientation, each end of said arm comprising one of the support elements, said arm being mounted to move in rotation relative to the shuttle around a main axis between an upright position corresponding to the direction of movement of the shuttle, and an oblique position that is inclined relative to the upright position;
the conveyor comprises an actuator that is able to control the arm between its upright position and its oblique position;
the actuator is able to be actuated by an actuating element carried by one of the adjacent shuttles.

BRIEF DESCRIPTION OF THE FIGURES

Other characteristics and advantages of the invention will emerge during the reading of the following detailed description, for the understanding of which reference will be made to the accompanying drawings in which:

FIG. 1 is a top view that diagrammatically shows an installation for producing containers that is equipped with a heating station comprising a conveyor made according to a first embodiment of the invention;

FIG. 2 is a side view that shows a part of the loading section of the conveyor on which two shuttles travel that are spaced longitudinally by a first spacing;

FIG. 3 is a side view that shows a portion of the heating section of the conveyor on which four shuttles travel that are longitudinally spaced by a second spacing;

FIG. 4 is a side view that shows a portion of an off-loading section of the conveyor on which two shuttles travel that are longitudinally spaced by a third spacing;

DETAILED DESCRIPTION OF THE FIGURES

Figure 5:
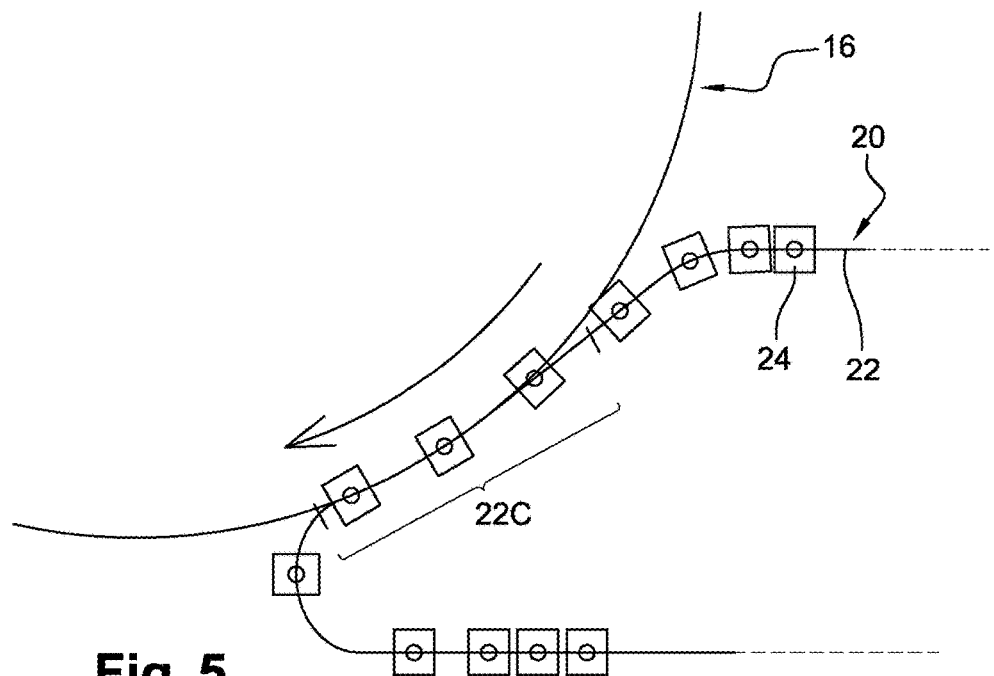
FIG. 5 is a top view that shows the off-loading section of the conveyor according to a variant of the first embodiment of the invention.

In the following description, elements having an identical structure or similar functions will be designated by the same references.

In the following description, in a nonlimiting way, a longitudinal direction, directed from back to front in the direction of movement of the preforms, a vertical direction, directed from bottom to top at right angles with the plane of movement of the preforms, and a transverse direction that is perpendicular to the two preceding directions will be adopted.

Shown in FIG. 1 is a part of an installation 10 for mass production of containers of thermoplastic material such as polyethylene terephthalate or PET. The production installation 10 here is intended to form containers from preforms 12 to be heated.

The production installation 10 comprises a station 14 for heating the preforms 12 and a forming station 16, here by blow molding or stretch blow molding, of the preforms 12 previously heated by said heating station 14.

The heating station 14 comprises a heating tunnel 18, which is made here in three successive sections. The heating tunnel 18 has been represented diagrammatically. The heating tunnel 18 defines a heating path that is designed to be passed through by each preform 12.

Traditionally, such a heating tunnel 18 (or each section of the tunnel) is bordered by two side walls (not shown) that form a tunnel. At least one of the walls is equipped with heating means, such as infrared lamps (not shown), emitting radiation that heats the preforms. The heating tunnel 18 can also be equipped with ventilation means making it possible to facilitate a homogeneous heating of the preforms and making it possible to prevent an overheating of certain components of the heating station 14.

The heating station 14 also comprises a conveyor 20 that is designed to transport each preform 12 through the heating tunnel 18. In normal operation of the production installation 10, the conveyor 20 here is intended to transport the preforms 12 continuously, i.e., without interruption of the movement of the preforms 12. The length of the heating tunnel 18 and the strength of the heating means are adapted so that the preforms 12 emerge heated to a temperature that is sufficient for their forming by the forming station 16.

The conveyor 20 comprises at least one moving track 22 that forms a closed circuit and on which shuttles 24 travel. Each shuttle 24 is individually controlled in movement, i.e., independently from the other shuttles 24.

In a variant, not shown, of the invention, the track goes through the heating station in an open circuit, the track also serving the upstream or downstream treatment stations. Such an arrangement is qualified as "sequential."

The shuttles 24 and the moving track 22 are part of a linear motor. In such a motor, the moving track 22 comprises a stator that is formed by a series of coils (not shown) that are distributed along the track 22. Each coil is controlled individually to induce locally a magnetic field independently of the other coils.

The coils are controlled by, for example, an electronic control unit (not shown) that is programmed in an appropriate manner.

Each shuttle 24 is equipped with at least one permanent magnet that reacts to the magnetic field induced by each coil of the track 22 by causing the movement of the shuttle 24 along the track 22. Also, each shuttle 24 is guided in movement along the moving track 22.

The spacing between two coils is small enough to make it possible to control the coils of the moving track 22 so as to cause the movement of each shuttle 24 independently from the other shuttles 24.

Such a linear motor is sold by, for example, the Beckhoff Company under the name "XTS." For more complete details concerning this technology, reference can be made to the documents US-A1-2013/0,119,897, US-A1-2013/0,035,784, WO-A1-2013/143,783, or else WO-A1-2013/143,950.

Generally, this technology used in the framework of the invention makes it possible to move all of the shuttles 24 in a line in the same direction of movement along the circuit, here a counterclockwise direction. The speed of movement of each shuttle 24 is able to be controlled individually by an electronic control unit (not shown).

Each shuttle 24 comprises at least one element for individual support of a preform 12.

In the embodiment of the invention shown in FIGS. 1 to 4, each shuttle 24 comprises a single element for individual support of a preform 12. In the example shown in FIGS. 2 to 4, it is a mandrel 26 that is inserted vertically into a neck of the preform 12. Thus, each shuttle 24 is able to transport a preform 12.

The mandrel 26 is, for example, mounted to slide vertically on the shuttle 24 between a low position for grasping a preform and a high position for ejecting the preform. The sliding, for example, is controlled by an electric motor or by a cam system.

The moving track 22 can be divided into several sections.

At least one section called "heating section 22B" of the moving track 22 makes it possible for the shuttles 24 to transport the preforms 12 along the heating path. The heating section 22B extends from an entrance 28 of the heating tunnel 18 to an exit 30 from the heating tunnel 18.

A section called "loading section 22A" of the moving track 22 is arranged upstream from the entrance 28 of the heating tunnel 18, in the direction of travel of the shuttles 24. The preforms 12 to be heated are loaded onto the shuttles 24 traveling on this section 22A. Thus, the shuttles 24 arrive on this loading section 22A "empty," and they emerge from it loaded with a preform 12 to be heated.

A section called "off-loading section 22C" of the moving track 22 is inserted between the exit 30 of the heating tunnel 18 and the loading section 22A, in the direction of travel of the shuttles 24. The hot preforms 12 are off-loaded from the shuttles 24 traveling on this off-loading section 22C. Thus, the shuttles 24 arrive on this off-loading section 22C each loaded with a hot preform 12 after it has passed through the heating tunnel 18, and they emerge from it "empty."

The production installation 10 also comprises an input device 32 for the preforms 12 to be heated that brings the preforms 12 to be heated to the loading section 22A of the moving track 22 for their loading onto the shuttles 24. The input device 32 is able to bring, to the loading section 22A, each preform 12 successively, two successive preforms 12 being separated by a determined input spacing in their direction of movement.

In the example shown in FIG. 1, the input device 32 is formed by a wheel 34 that has notches 36. The wheel 34 is mounted to rotate around a vertical axis. The wheel 34 has on its periphery notches 36, each of which is able to carry a preform 12 in combination with means that are known and not shown, such as peripheral guides for guiding. Two adjacent notches 36 are separated circumferentially by said determined input spacing.

In the embodiment shown in FIG. 1, the installation 10 also comprises an output device 38 for the hot preforms 12 that is able to transfer the preforms 12 from the off-loading section 22C of the moving track 22 to the forming station 16. The output device 38 is designed to carry the preforms 12 one after the other, two successive preforms 12 being separated by a determined output spacing in their direction of movement.

In the example shown in FIG. 1, the output device 38 is formed by a wheel 40 equipped on its periphery with a plurality of arms 42. Each arm 42 comprises at its free end a support element such as a clip 44 that can grab a preform 12 by its neck.

The forming station 16 here is formed by a carousel 46 (only one part of which is shown) that carries a plurality of molding units 48 on its periphery. The carousel 46 is mounted to rotate so as to move the preforms 12 and then the containers during their forming. Such a forming station is well known and will therefore not be described in more detail below.

Generally, the circumferential separation between two adjacent molding units 48 is greater than the determined output spacing of the hot preforms 12. In this respect, the arms 44 are generally mounted to pivot and/or to slide on the wheel 40 to make it possible to change the spacing between two successive preforms 12 during their transport to the forming station 16. Thus, the preforms 12 are separated by a spacing that is suitable for the separation between two molding units 48 during their transfer onto the forming station 16.

Now, a method for controlling the conveyor 20 will be described that makes it possible to benefit fully from the energy used by the means for heating the heating tunnel 18.

In this embodiment, the separation between two successive shuttles 24 is equal to the longitudinal separation between the two support elements of these two shuttles 24, which elements consist here of the mandrels 26.

As shown in FIG. 2, when they travel on the loading section 22A of the moving track 22, two successive shuttles 24 travel with a first determined input separation "E1." This first separation "E1" corresponds to the determined input spacing of the preforms 12 to be heated. Thus, each shuttle 24 passes concurrently with a notch 36 of the input device 32 making it possible to insert the mandrel 26 into the neck of the preform 12 while it is still supported by the notch 36.

Then, at least from their entry onto the heating section 22B, the shuttles 24 are controlled so that the separation between two successive shuttles is reduced relative to said first input separation "E1." The separation between two successive shuttles 24 remains reduced relative to said first input separation "E1" as long as they travel on the heating section 22B, i.e., at least up to their exit from the heating tunnel 18. This has the effect of reducing the spacing between two preforms 12 during their heating.

Thus, a larger proportion of the radiation emitted by the heating means is absorbed effectively by the preforms 12 for their heating.

Also, this makes it possible to have a larger quantity of preforms travel simultaneously in the heating tunnel 18.

In the embodiment shown in FIG. 3, the separation between two successive shuttles 24 remains equal to a second constant separation "E2," called separation for heating, which does not change so long as they are traveling on the heating section 22B of the moving track 22.

Then, when the shuttles 24 arrive on the off-loading section 22C, they are controlled so that two successive shuttles 24 travel with a third determined output separation "E3," as illustrated by FIG. 4. This third separation "E3" is determined so as to minimize the change in spacing between two successive preforms 12 during their transport by the output device 38.

Each shuttle 24 is more particularly controlled so as to travel concurrently with a support element 44 corresponding to the output device 38 to make possible the transfer of the preforms 12 from the conveyor 20 to the output device 38.

In a variant, not shown, of the invention, the separation between two successive shuttles traveling on the heating section can vary, while remaining less than the input separation. Such a variation of the separation makes it possible in particular to control more precisely the heating profile of the preforms, particularly when certain portions of the bodies of the preforms must be heated in a preferential manner. In other words, the separation E2 can vary.

According to the embodiment shown in FIGS. 2 and 4, the third output separation "E3" is different from the first input separation "E1." Here, the third output separation "E3" is greater than the first input separation "E1." Consequently, the third output separation "E3" is also greater than the second separation "E2" for heating.

In a general manner, the second separation "E2" for heating is advantageously less than the first input separation "E1" and the third output separation "E3."

Shown in FIG. 5 is a variant of this first embodiment, in which the third separation "E3" between the shuttles 24 traveling on the off-loading section 22C coincides with the spacing between two molding units 48 of the forming station 16. In this case, it is no longer necessary to provide an output device 38 that can modify the spacing between the preforms 12 since the preforms are already separated by the spacing adapted to the forming station 16.

As shown in FIG. 5, the preforms 12 here are directly transferred from the conveyor 20 to the forming station 16 without inserting intermediate transport means between the heating station 14 and the forming station 16. Thus, the hot preforms 12 are directly deposited in the molding units by the shuttles 24.

This arrangement makes it possible to make a very compact production installation 10. Further, it makes it possible to reduce the transfer time between the heating of the preforms and their forming.

Figure 6:
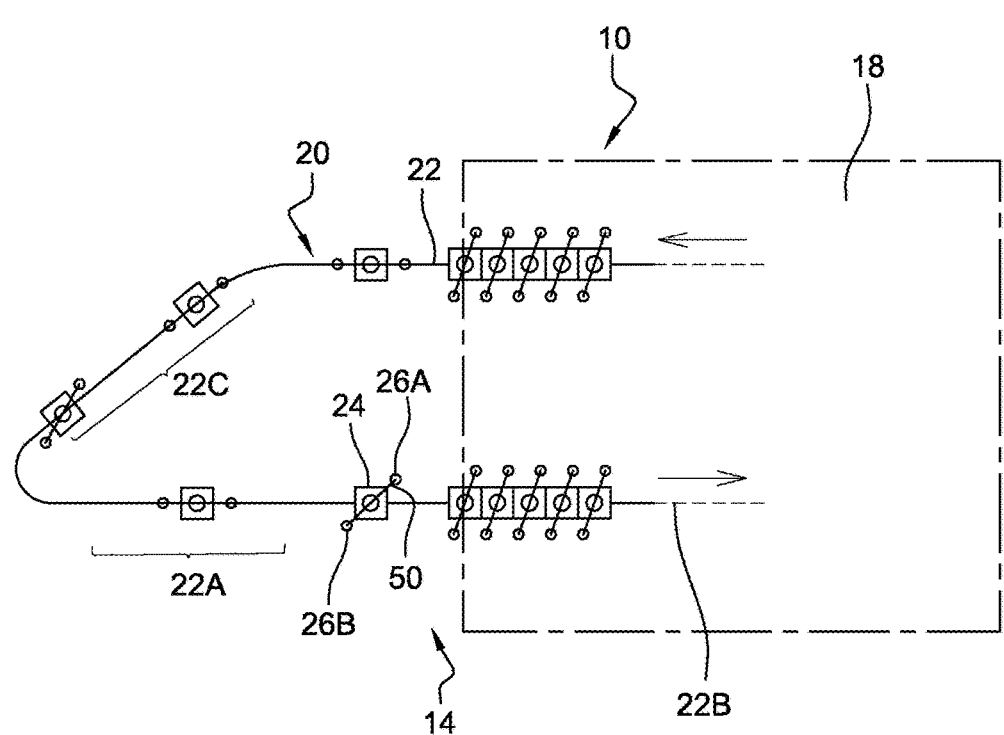
FIG. 6 is a top view similar to that of FIG. 1 that shows a second embodiment of the conveyor.

Shown in FIG. 6 is a second embodiment of the production installation 10. This installation 10 is similar to the one described in the first embodiment shown in FIG. 1. Therefore, only the differences with this first embodiment will be described below.

In this second embodiment, each shuttle 24 comprises a first support element 26A for a first preform 12 and a second support element 26B for a second preform 12. The shuttle 24 is thus able to carry two preforms 12 simultaneously. Each support element 26A, 26B is, for example, formed by a mandrel.

The support elements 26A, 26B are mounted to move on the shuttle 24 between an extended position in which the support elements 26A, 26B are separated by the first input spacing of the preforms in the direction of movement of the shuttle 24, and a close position in which the support elements 26A, 26B are moved toward each other in the direction of movement of the shuttle 24.

To achieve this, the shuttle 24 comprises an arm 50 that defines an axis of orientation. Each end of said arm 50 comprises one of the support elements 26A, 26B.

The arm 50 is itself mounted to pivot on the shuttle 24 around a vertical main axis between an upright position corresponding to the direction of movement of the shuttle 24, and an oblique position that is inclined relative to the upright position. The pivoting of the arm 50 between its two positions is, for example, controlled by an actuator (shown schematically as "A" in FIG. 2) carried on the shuttle 24.

During the operation of the conveyor 20, the shuttles 24 traveling on the loading section 22A of the moving track 22 are controlled to be spaced by a first separation "E1" that is equal to twice the determined input spacing of the preforms 12. Also, the arm 50 is controlled in its upright position. Thus, all of the support elements 26A, 26B, in their extended position, are spaced by the same spacing as the input spacing of the preforms 12.

When the shuttles 24 travel on the heating section 22B of the moving track 22, the arms 50 are controlled toward their oblique position. This makes it possible for the shuttles 24 to be controlled so as to be spaced by a second separation "E2" that is much smaller than the first separation "E1." The shuttles 24 are more particularly controlled so that the preforms 12 are distributed on two rows, as is shown in FIG. 6. The preforms 12 of the first row are carried by the transport elements 26A that are positioned at the front of the shuttles 24 while the preforms 12 of the second row are carried by the transport elements 26B positioned at the rear of the shuttles 24.

In addition, in the oblique position, the arm 50 forms an angle with the direction of movement of the shuttles 24, for example an angle of 45°, so that the preforms 12 of the first row are offset longitudinally between two preforms 12 of the second row.

In this position and with this separation "E2" between the shuttles 24, the support elements 26A, 26B occupy their close position. This particularly compact arrangement makes it possible to have a large quantity of preforms 12 travel simultaneously in the heating tunnel 18 while making it possible for all of the preforms 12, whatever their row, to be exposed to the same amount of heating radiation as the other preforms 12.

In this second embodiment, the input spacing of the preforms is equal to the output spacing of the preforms. Thus, when they travel on the off-loading section 22C, the shuttles 24 are controlled to be spaced by said first separation "E1" that is equal to twice the determined input spacing of the preforms 12. Also, the arm 50 is controlled in its upright position. Thus, all of the support elements 26A, 26B, in their extended position, are spaced by the same spacing as the output spacing of the preforms 12.

The actuator is, for example, an autonomous actuator, such as a motor, which is borne on the associated shuttle.

In a variant, not shown, of the invention, the actuator requires an external intervention to be actuated. It is, for example, a cam control device. A cam follower is, for example, carried on the shuttle, while a cam path positioned parallel to the travel track makes it possible to act on the cam follower to actuate the arm.

In a variant, not shown, of the invention, the actuator can be actuated by an actuating element (shown schematically as "E" in FIG. 2) carried by one of the adjacent shuttles. Thus, when the separation between two shuttles 24 is reduced, a pusher of a shuttle 24 is able to come into contact with a pivoting mechanism of an adjacent shuttle 24 to control the pivoting of the arm 50. It is, for example, a cam device or a meshing gear device.

The control method performed according to the teachings of the invention thus makes it possible to have a larger number of preforms travel in the heating tunnel, independently of the input spacing and the output spacing of the preforms.

Of course, the method is not limited to the embodiment that is shown in the figures. For example, a station for treating the preforms and/or the final containers can be inserted between the exit of the furnace and the off-loading section. Such a configuration is particularly advantageous in an arrangement called "sequential" of the treatment stations, as has been explained above. In this case, the conveyor makes it possible to carry a hollow body from its initial state in the form of a preform, then, after the forming of said preform, in its final state of finished container.

In addition, the control method also makes it possible to modulate the separation between two shuttles so as to space the preforms by a first input spacing on the loading section 22A, by a second spacing for heating on the heating section 22B and by a third output spacing on the off-loading section 22C. These three spacings can be different from one another.

The invention claimed is:

1. A method for controlling a conveyor (20) of hollow bodies (12) through a heating station (14) for an installation (10) for producing containers of thermoplastic material, comprising:
   a heating tunnel (18) defining a heating path;
   the conveyor (20) comprising at least one moving track (22), each of the at least one moving track forming one closed circuit, the conveyor further comprising a plurality of shuttles (24) associated with said at least one moving track, each of the shuttles of the associated plurality of shuttles being structured to travel along said at least one moving track (22) and to carry at least one hollow body (12), each shuttle (24) being controlled individually in movement along the closed circuit, independently from the other shuttles of the plurality of shuttles, the at least one moving track (22) having a heating section (22B) for the conveying of the hollow bodies (12) along the heating path;
   an input device (32) for the hollow bodies (12) to be heated that brings the hollow bodies (12) to a loading section (22A) of the at least one moving track (22) for their loading on the shuttles (24), two successive shuttles (24) traveling with a first determined input separation (E1) on the loading section (22A);
   an output device (38) for the hot hollow bodies (12) that recovers the hollow bodies (12) carried on the shuttles (24) that travel on an off-loading section (22C) of the at least one moving track (22);
   wherein the two successive shuttles (24) traveling on the off-loading section (22C) are spaced by a determined output separation (E3) that is different from the first input separation (E1).

2. The method according to claim 1, wherein, at least from their entry on the heating section (22B), the shuttles (24) are controlled so that the separation between the two successive shuttles (24) is reduced relative to said first input separation (E1).

3. The method according to claim 2, wherein the separation between the two successive shuttles (24) remains reduced relative to said first input separation (E1) as long as they are traveling on the heating section (22B).

4. The method according to claim 3, wherein the separation between the two successive shuttles remains equal to a second constant separation (E2) as long as they are traveling on the heating section (22B).

5. The method according to claim 4, wherein the output separation (E3) is greater than the second separation (E2) for heating.

6. The conveyor (20) for using the method according to claim 1, wherein each shuttle (24) comprises a first support element (26A) for a first hollow body (12) and a second support element (26B) for a second hollow body (12), each shuttle (24) thus being able to carry simultaneously two hollow bodies (12), the first and second support elements (26A, 26B) for each shuttle (24) being mounted to move on said shuttle (24) between an extended position in which the first and second support elements (26A, 26B) are separated by said first input separation (E1) in the direction of movement of the shuttle (24), and a close position in which the support elements (26A, 26B) are brought close to one another in the direction of movement of this shuttle (24).

7. The conveyor (20) according to claim 6, wherein each shuttle (24) comprises an arm (50) that defines an axis of orientation, each end of said arm (50) comprising one of the first and second support elements (26A, 26B) for its respective shuttle, said arm (50) being mounted to move in rotation relative to the shuttle (24) around a main axis between an upright position corresponding to the direction of movement of the shuttle (24), and an oblique position that is inclined relative to the upright position.

8. The conveyor (20) according to claim 7, further comprising an actuator that is able to control wherein the arm (50) between its upright position and its oblique position.

9. The conveyor (20) according to claim 8, wherein the actuator is able to be actuated by an actuating element carried by one of the adjacent shuttles (24).

10. The conveyor (20) for using the method according to claim 2, wherein each shuttle (24) comprises a first support element (26A) for a first hollow body (12) and a second support element (26B) for a second hollow body (12), each shuttle (24) thus being able to carry simultaneously two hollow bodies (12), the support elements (26A, 26B) for each shuttle (24) being mounted to move on said shuttle (24) between an extended position in which the support elements (26A, 26B) are separated by said first input separation (E1) in the direction of movement of the shuttle (24), and a close position in which the support elements (26A, 26B) are brought close to one another in the direction of movement of this shuttle (24).

11. The conveyor (20) for using the method according to claim 3, wherein each shuttle (24) comprises a first support element (26A) for a first hollow body (12) and a second support element (26B) for a second hollow body (12), each shuttle (24) thus being able to carry simultaneously two hollow bodies (12), the support elements (26A, 26B) for each shuttle (24) being mounted to move on said shuttle (24) between an extended position in which the support elements (26A, 26B) are separated by said first input separation (E1) in the direction of movement of the shuttle (24), and a close position in which the support elements (26A, 26B) are brought close to one another in the direction of movement of this shuttle (24).

12. The conveyor (20) for using the method according to claim 4, wherein each shuttle (24) comprises a first support element (26A) for a first hollow body (12) and a second support element (26B) for a second hollow body (12), each shuttle (24) thus being able to carry simultaneously two hollow bodies (12), the support elements (26A, 26B) for each shuttle (24) being mounted to move on said shuttle (24) between an extended position in which the support elements (26A, 26B) are separated by said first input separation (E1) in the direction of movement of the shuttle (24), and a close position in which the support elements (26A, 26B) are brought close to one another in the direction of movement of this shuttle (24).

13. The conveyor (20) for using the method according to claim 5, wherein each shuttle (24) comprises a first support element (26A) for a first hollow body (12) and a second support element (26B) for a second hollow body (12), each shuttle (24) thus being able to carry simultaneously two hollow bodies (12), the support elements (26A, 26B) for each shuttle (24) being mounted to move on said shuttle (24) between an extended position in which the support elements (26A, 26B) are separated by said first input separation (E1) in the direction of movement of the shuttle (24), and a close position in which the support elements (26A, 26B) are brought close to one another in the direction of movement of this shuttle (24).

* * * * *